(12) United States Patent
Browne et al.

(10) Patent No.: US 7,392,876 B2
(45) Date of Patent: Jul. 1, 2008

(54) HOOD ASSEMBLY UTILIZING ACTIVE MATERIALS BASED MECHANISMS

(75) Inventors: Alan L. Browne, Grosse Pointe, MI (US); Nancy L. Johnson, Northville, MI (US)

(73) Assignee: General Motors Corporation, Detroit, MI (US)

( * ) Notice: Subject to any disclaimer, the term of this patent is extended or adjusted under 35 U.S.C. 154(b) by 297 days.

(21) Appl. No.: 10/864,724

(22) Filed: Jun. 9, 2004

(65) Prior Publication Data
US 2005/0275246 A1    Dec. 15, 2005

(51) Int. Cl.
*B60R 21/34* (2006.01)
(52) U.S. Cl. ............... 180/274; 296/187.04; 296/193.11
(58) Field of Classification Search ............ 296/193.11, 296/187.03, 187.4, 187.09, 187.1; 180/274, 180/271, 69; 280/752, 753, 748; *B60R 21/34; B62D 25/10, 25/12*
See application file for complete search history.

(56) References Cited

U.S. PATENT DOCUMENTS

| | | | | |
|---|---|---|---|---|
| 1,748,371 | A * | 2/1930 | Trieschmann | 293/15 |
| 4,249,632 | A * | 2/1981 | Lucchini et al. | 180/274 |
| 4,702,094 | A | 10/1987 | Peterson | |
| 4,923,057 | A * | 5/1990 | Carlson et al. | 188/378 |
| 5,068,018 | A * | 11/1991 | Carlson | 204/554 |
| 5,725,928 | A | 3/1998 | Kenney et al. | |
| 5,727,391 | A * | 3/1998 | Hayward et al. | 60/528 |
| 5,794,975 | A * | 8/1998 | Nohr et al. | 280/753 |
| 6,086,599 | A | 7/2000 | Lee et al. | |
| 6,375,251 | B1 * | 4/2002 | Taghaddos | 296/187.03 |
| 6,386,623 | B1 * | 5/2002 | Ryan et al. | 296/187.04 |
| 6,390,878 | B1 * | 5/2002 | Zhou et al. | 446/14 |
| 6,415,883 | B1 * | 7/2002 | Myrholt et al. | 180/274 |
| 6,428,080 | B1 | 8/2002 | Ochoa | |
| 6,786,508 | B2 * | 9/2004 | Fraley et al. | 280/751 |
| 6,824,202 | B2 * | 11/2004 | Vismara et al. | 296/193.11 |
| 6,848,738 | B2 * | 2/2005 | Kempf et al. | 296/187.04 |
| 6,910,714 | B2 * | 6/2005 | Browne et al. | 280/753 |
| 6,966,602 | B2 * | 11/2005 | Mae | 296/187.03 |
| 6,986,855 | B1 * | 1/2006 | Hood et al. | 264/219 |
| 7,029,044 | B2 * | 4/2006 | Browne et al. | 293/137 |
| 7,063,377 | B2 * | 6/2006 | Brei et al. | 296/187.09 |

(Continued)

FOREIGN PATENT DOCUMENTS

WO    WO 01/84002 A2    11/2001

*Primary Examiner*—Ruth Ilan
*Assistant Examiner*—Leonard McCleary, Jr.

(57) ABSTRACT

An active material hood impact mitigation mechanism is activated in response to a signal generated from an impact sensor or pre-impact sensor or manually. The mitigation mechanism is capable of changing either reversibly or irreversibly the stiffness, shape, location, orientation, or displacement force of the hood either globally or locally, before an impact against the hood. The active material mitigation mechanism is held in a device designed to be installed in operative communication with the hood surface. The active material is characterized by a first shape or stiffness and is operative to change to a second shape or stiffness in response to the activation signal. Such active materials include shape memory alloys, electroactive polymers, shape memory polymers, magnetic shape memory alloys, magnetorheological fluids, magnetorheological elastomers, electrorheological fluids, and piezoelectric materials.

17 Claims, 3 Drawing Sheets

U.S. PATENT DOCUMENTS

| | | |
|---|---|---|
| 2002/0007884 A1 | 1/2002 | Schuster et al. |
| 2004/0046377 A1* | 3/2004 | Meduvsky et al. .......... 280/752 |
| 2004/0078127 A1* | 4/2004 | Johnson et al. ............... 701/45 |
| 2004/0195815 A1* | 10/2004 | Browne et al. .............. 280/753 |
| 2004/0217627 A1* | 11/2004 | Mae ....................... 296/187.03 |
| 2005/0264036 A1* | 12/2005 | Kramarczyk et al. ... 296/187.03 |
| 2006/0028051 A1* | 2/2006 | Brei et al. .............. 296/187.04 |
| 2006/0232051 A1* | 10/2006 | Morris et al. ............... 280/732 |

\* cited by examiner

HOOD ASSEMBLY UTILIZING ACTIVE MATERIALS BASED MECHANISMS

BACKGROUND

The present disclosure generally relates to a hood assembly for use in an automotive vehicle, wherein the hood assembly includes the use of active materials based mechanisms.

Numerous motor vehicles employ a hingeable hood disposed in a region between the passenger compartment and the forward bumper of the motor vehicle, or between the passenger compartment and the rearward bumper of the motor vehicle. The hingeable hood provides a mechanism for accessing the underlying engine or storage compartment. The vehicle hood is typically formed of a relatively thin sheet of metal or plastic that is molded to the appropriate contour corresponding to the overall vehicle body design. The exterior of the hood portion, which constitutes the show surface thereof, is typically coated with one or more coats of primer and paint for enhancing both the aesthetic character and the corrosion resistance of the underlying material. Due to the relatively thin nature of the material forming the hood portion, a support structure such as a contoured plate with stamped rib supports typically extends across the underside of the hood portion so as to provide a degree of dimensional stability to the structure.

Aerodynamics, styling, and packaging considerations, among others, have all contributed to the design of the front ends and hood regions of current vehicles. Aerodynamic drag (and fuel economy considerations) in particular has contributed to the hood being in close proximity to the engine or storage compartment. Accordingly, hood deformation such as may occur upon impact of an object onto the hood, and thus the ability of the hood to absorb energy at appropriate force levels before bottoming out against hard objects beneath it, is somewhat limited by the contents of the compartment.

In response, automobile manufacturers have proposed a number of mechanisms that change the orientation of the hood before a deformation event such as the impact event previously described. For example, hood lifters may be activated by impact sensors to increase the space between the hood and the underlying compartment. The hood lifters change the orientation of the hood by raising it (in most mechanisms by raising it at a rear edge while maintaining attachment of a front edge to the vehicle structure, i.e., tilting) above the engine compartment. Upon deformation then, because of the increase in clearance there is an increase in the amount of the energy that can be absorbed by deformation of the sheet metal before bottoming out. One drawback to such hood lifting mechanisms is that they tend to be irreversible (which makes them best suited for use only with crash and not with pre-crash sensors), so that such mechanisms will need to be replaced/repaired even if collision does not in fact occur.

Accordingly, there remains a need in the art for automotive hood components having improved energy absorbing capabilities such as may occur upon deformation of the hood. The means/mechanisms that produce this energy absorbing capabilities are preferably reversible as well.

BRIEF SUMMARY

Disclosed herein are methods, devices, systems, and hingeable hood assemblies utilizing an active material enabled approach to provide enhanced energy absorption properties. In one embodiment, the hood assembly comprises a hood; an active material disposed in operative communication with the hood, wherein the active material comprises a shape memory alloy, a shape memory polymer, a magnetorheological fluid, an electroactive polymer, a magnetic shape memory alloy, a magnetorheological elastomer, an electrorheological fluid, a piezoelectric material, or combinations comprising at least one of the foregoing active materials; and an activation device coupled to the active material, the activation device being operable to selectively provide an activation signal to the active material and effectuate a change in the shape, dimension, and/or flexural modulus property (shear property, if the active material is liquid) of the active material, wherein the change in the shape, dimension, and/or flexural modulus properties of the active material changes an energy absorption property of the hood.

A device positioned in operative communication with a hood hingeably attached to a vehicle comprises an active material operative to change from a first shape, dimension, or a first stiffness to a second shape, dimension, or second stiffness in response to an activation signal, wherein the second shape, dimension, effectively increases the energy absorbing properties of the hood.

A system for mitigating damage to an object from impact with a vehicle hood comprises a sensor that generates a signal based on pre-impact or impact information; and a controller disposed to receive the sensor signal and deliver an activation signal to at least one device in operative communication with the hood; wherein the at least one device comprises an active material operative to change from a first shape, a first dimension, or a first stiffness to a second shape, a second dimension, or second stiffness in response to the activation signal.

A method for reducing damage to an object from an impact with a hood hingeably attached to a vehicle comprises sensing the impact; generating an activation signal; and activating a device in response to the activation signal, wherein the device changes a position of the hood from a first position to a second position by actively changing shape, dimension, and/or stiffness of an active material disposed in the device.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Methods, devices and hood assemblies for reversibly increasing the energy absorption capability at appropriate force levels of a vehicle hood are disclosed herein. As used herein, the term "hood" generally refers to the lids covering the engine or trunk areas. The method generally includes sensing the impact, generating a signal, and activating an active material in operative communication with the hood upon receipt of the signal. Alternatively, an occupant of the vehicle may generate the signal manually. The active material, in operative communication with the hood, increases the energy absorbing capabilities by changing the hood shape, changing the hood stiffness, changing the stiffness of the mounting hardware, and/or changing the hood orientation through active lifting and/or active tilting means to provide increased clearance from underlying engine compartment. The resulting deformation behavior including stiffness and modulus properties can be altered either globally or locally.

In one embodiment, the active material changes the shape or orientation of a vehicle hood in response to an activation signal. A device or actuator contains the active material, wherein the active material has a first shape, dimension, or stiffness and is operative to change to a second shape, dimension, stiffness, and/or provide a change in shear strength in response to the activation signal. The device is designed to be installed in operative communication with the hood.

In another embodiment, a vehicle system contains an impact sensor that generates an impact signal. The system further contains a controller disposed to receive the impact signal and a hood impact mitigation device that operates upon receiving the activation signal from the controller. The active material changes its shape, stiffness or other physical property in response to the activation signal. The mitigation device, for example, may be a hood lifter.

Figure 1:
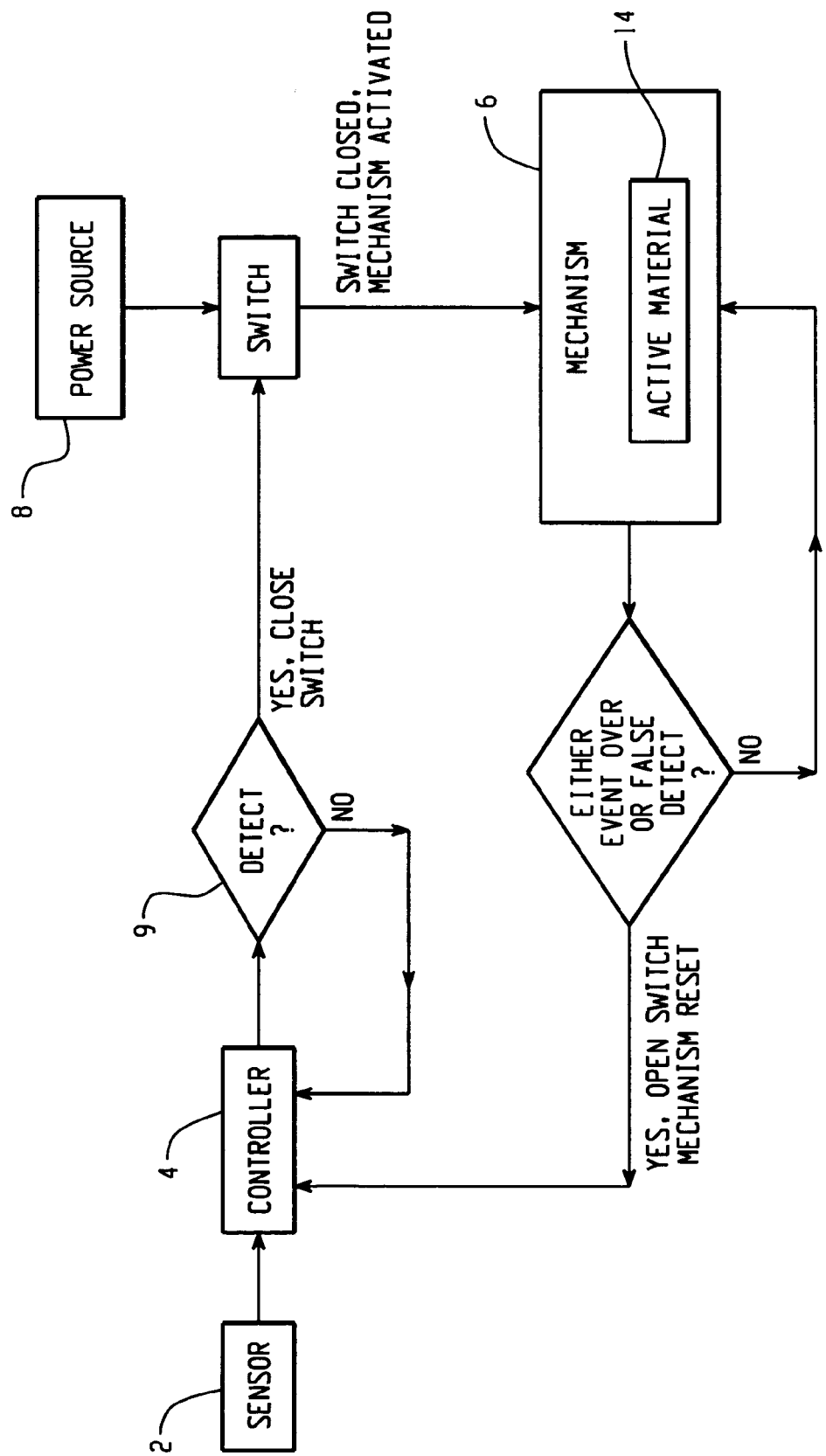
FIG. 1 is a block diagram showing common elements of hood mechanisms.

In various embodiments, the response of the mitigation device to the signal may be reversible (to prevent damage in the event that an impact does not occur) and/or may be tailored both locally and globally to the particular nature of the impact event. It may also, for example, in the case of stiffness changes, be unnoticeable or undetectable (fully reversible), unless an impact occurs, to the vehicle operator. Further, there is minimal interference with vehicle operation. Common elements to the various embodiments described herein are illustrated in FIG. 1. Such elements include a sensor 2 plus a controller 4 for triggering the active material based mechanism 6. It further contains a power source 8 and one or more active materials 14 incorporated into the mechanism 6. In a preferred mode of operation, the mechanism is unpowered during normal driving and is activated or powered when triggered by an output signal from the controller 4 based on input to it from an impact or pre-impact sensor, schematically illustrated by 9 in FIG. 1. Such a mechanism would remain activated through the impact event but then automatically be deactivated upon the conclusion of the impact. In an alternative embodiment, the mechanism would be deactivated upon a timer timing out, which would be useful in the case of a false detect.

As used herein, the term "active materials" generally refers to those materials that exhibit a change in stiffness, dimension, shape, or shear force upon application of an activation signal. Depending on the active material, the activation signal can take the form of an electric field, a temperature change, a magnetic field or a mechanical loading or stressing. Suitable active materials include, without limitation, shape memory alloys (SMA), magnetic shape memory alloys, shape memory polymers (SMP), piezoelectric materials, electroactive polymers (EAP), magnetorheological fluids and elastomers (MR), and electrorheological fluids (ER).

Shape memory alloys can exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which shape memory alloy finishes transforming to the martensite phase is called the martensite finish temperature ($M_f$). Generally, the shape memory alloys have a lower modulus and are more easily deformable in their martensitic phase and have a higher modulus and are thus less easily deformable in the austenitic phase.

Suitable shape memory alloys can exhibit a one-way shape memory effect, an intrinsic two-way effect, or an extrinsic two-way shape memory effect depending on the alloy composition and processing history. Preferably, a counterbalancing spring is employed in combination with the shape memory alloy to provide a restoring force. In this manner, the actuator can be made reversible. The return spring preferably has a modulus somewhere between the martensite and austenite phase transformation temperatures of the shape memory alloy. Optionally, the return spring is a pre-existing component of the hood itself that the shape memories alloy was used to deform. Alternatively, separately actuatable parallel SMA elements can be alternately activated, each reversing the action of the other.

Shape memory materials formed from shape memory alloy compositions that exhibit one-way shape memory effects do not automatically reform, and depending on the shape memory material design, will likely require an external mechanical force to reform the shape, dimension, that was previously exhibited. Shape memory materials that exhibit an intrinsic shape memory effect are fabricated from a shape memory alloy composition that will automatically reform themselves as a result of the above noted phase transformations.

Intrinsic two-way shape memory behavior is preferably induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles.

Shape memory materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the active material 14 with shape memory effects as well as high damping capacity. The inherent high damping capacity of the shape memory alloys can be used to further increase the energy absorbing properties of the energy absorbing assembly.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape, dimension, damping capacity, and the like. For example, a nickel-titanium based alloy is commercially available under the trademark NITINOL from Shape Memory Applications, Inc.

Other suitable active materials are shape memory polymers. Similar to the behavior of a shape memory alloy, when the temperature is raised through its transition temperature, the shape memory polymer also undergoes a change in shape, dimension. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape to the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof.

These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, AgCaSe 2, ZnSe, GaP, InP, ZnS, and mixtures thereof.

The action of the active material in the impact mitigation mechanism may be used either directly or indirectly to either reversibly or irreversibly raise or tilt the hood globally, deform (change the shape of the hood) globally, raise (deform) the hood locally, change the force needed to locally deform the hood (by for example providing a local change in material stiffness) and change the applied load needed to globally displace the hood (for example by changing the stroking force in ER and MR material hood mounts, attachments or lifters or by changing the stiffness of supporting or lifting springs made of shape memory alloys, and the like).

In some embodiments, the functionality is not provided entirely by the active material. In general, an active material is used to provide at least one, but not necessarily all of the following functions: changes in stiffness, actuation (changes in dimension, and/or shape either locally or globally of the hood and hood tilting or displacement), impact energy absorption and the tailorability thereof, and a self-healing or reversibility of the mechanism.

Figure 2:
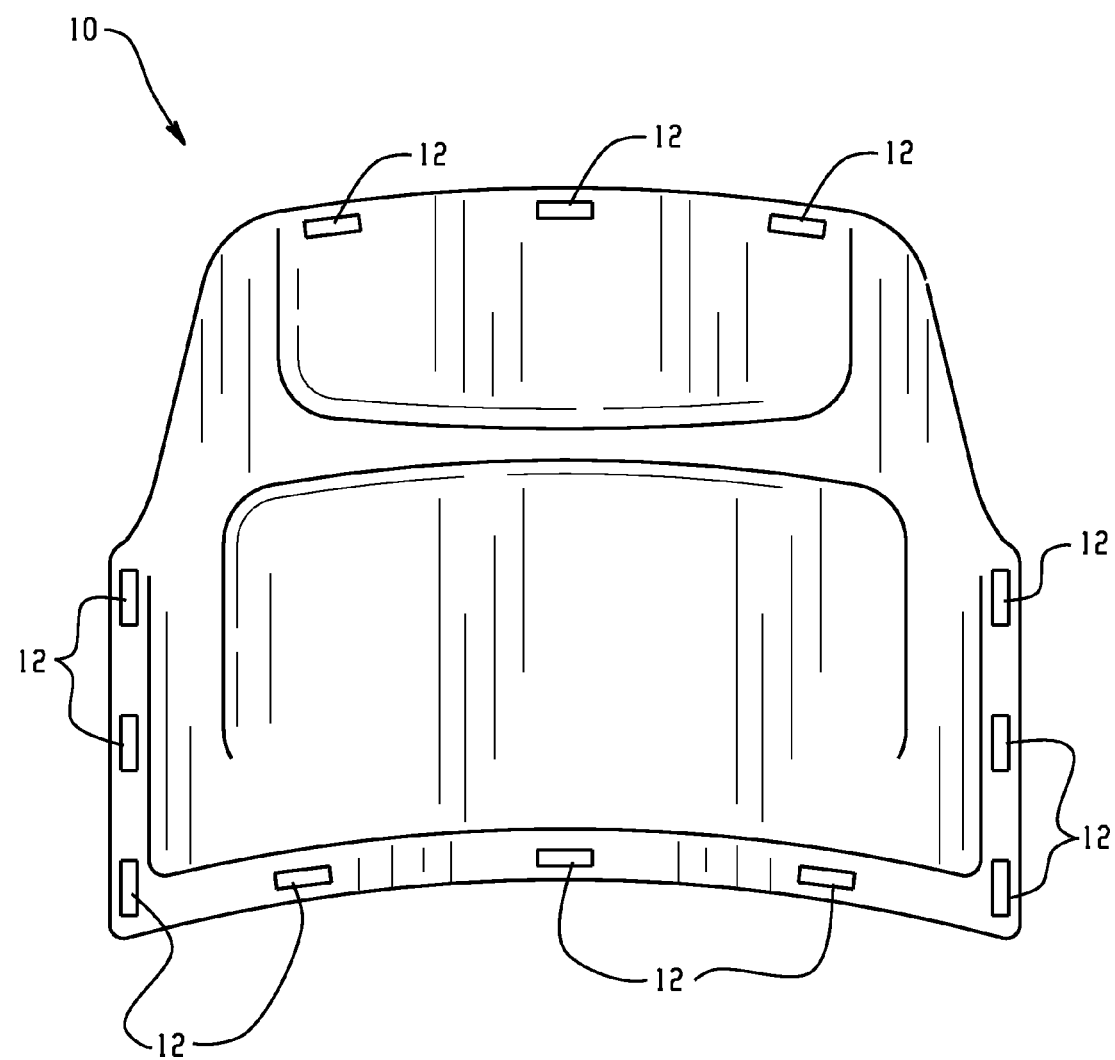
FIG. 2 is an underside plan view of a hood.

One embodiment of an active material based reversibly expandable on demand pad to locally raise the hood above a hard item beneath it is shown in FIG. 2. Such a pad may be mounted to the underside of the hood just above the hard object such that the on demand expansion of the pad would first fill any space between the hood and hard object (in this manner changing the compliance of the hood), and then deform the hood (if additional energy absorption capability is desired) upward upon further expansion. In FIG. 2, there is shown an underside of an exemplary hood, generally designated by reference numeral 10. As shown, active material based pads 12 are positioned about an underside of the hood 10. The exact positioning of the pads will depend on the energy absorption properties desired for the intended application. Although reference is made to the underside of the hood 10, it is contemplated that the active based material pads could be attached to the vehicle rails upon which the hood rests and is hinged thereto.

Figure 3:
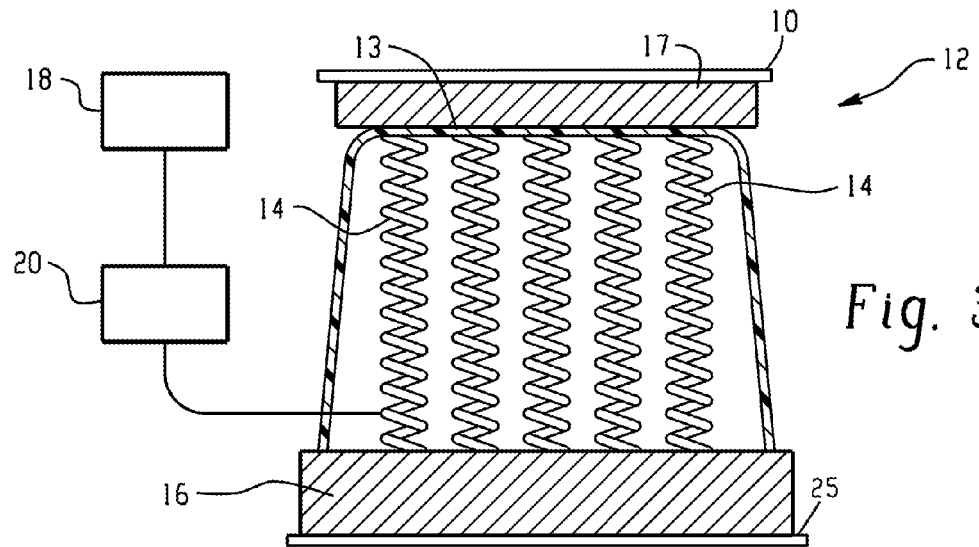
FIG. 3 is a schematic view of one embodiment of an active material based hood pedestrian mitigation device in a compact configuration.
Figure 4:
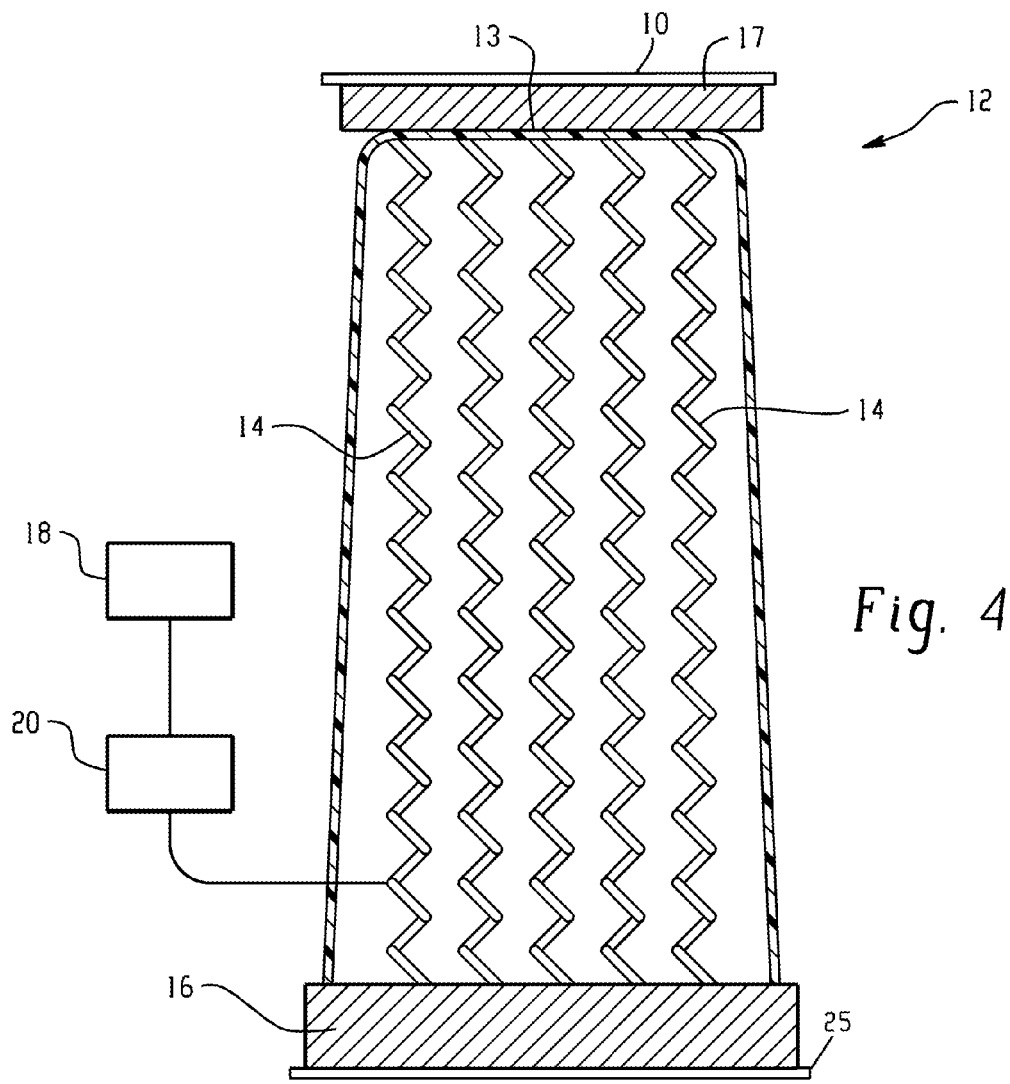
FIG. 4 is a schematic view of one embodiment of an active material based hood pedestrian mitigation device in an expanded configuration.

As shown in FIGS. 3 and 4, the active material based pads 12 generally include a covering 13 and an active material 14 in operative communication with the covering 13. Figure 3 illustrates the assembly in a compacted configuration and FIG. 4 illustrates the pad assembly in an expanded configuration. As shown, the active material based pad 12 is provided with a lower plate 16 adapted to provide mechanical communication with under hood components 25 such as an engine block and with an upper plate 17 that communicates with the underside of the hood 10. The pad may be installed by attaching either to the hood or to an under hood component, e.g., rails. As installed, the assembly at least partially fills the space between the hood 10 and components beneath the hood 10, e.g., engine. In one embodiment, the active material 14 is adapted to change shape to effect a change in the length dimension and cause the covering 13 to expand and/or detach in response to an activation signal. Alternatively, a pyrotechnic device or a stored elastic energy source can be employed to raise the hood 20, wherein the active material based pad 12 provides a mechanism for restoring the hood to its original position. In other embodiments, the active material based pads 12 can be configured to provide both expansion and contraction forces. That is, a portion of the pads can be adapted to provide an expansive force upon deployment whereas another portion can be adapted to provide contractive forces upon deployment.

In some embodiments, upon discontinuation of the activation signal, the active material can change substantially back to its original shape (and original length dimension) and simultaneously contract the covering substantially back to its original shape and/or original position. The activation signal provided for changing the shape, dimension, of the active material 14 may include a heat signal, an electrical signal, a pneumatic signal, a mechanical activation signal, combinations comprising at least one of the foregoing signals, and the like; the particular activation signal depending on the materials and/or configuration of the shape memory material 14. In some embodiments, the active material 14 thermally increases its length dimension in response to the activation signal to cause the covering 13 to expand and/or detach from its surrounding surface medium. At the same time, expansion of the pad causes plates 16 and 17 to engage the under hood component and hood respectively so as to deform the hood upward upon further expansion. The hood and the pad 10, in its expanded form can then be used to absorb the kinetic energy of an object hitting the hood. The covering 13 and the shape memory material 14, individually as well as in combination, may provide additional energy absorbing properties for the active material based pad 12.

In another embodiment, the active material based pad 12 further comprises a sensor 18 and a controller 20 in operative communication with the active material 14 for expanding (and/or detaching) the covering 13 in response to an activation signal provided by the sensor 18. The sensor 18 is preferably configured to provide pre-impact information to the controller 20, which then actuates the hood lifting active material based pad 12 under pre-programmed conditions defined by an algorithm or the like. In this manner, the active material based pad 12 can be used to anticipate an event such as an impact with an object and provide a change in the hood configuration before absorption of the kinetic energy associated with the object as a result of the impact. The active material based pad 12 is exemplary only and is not intended to be limited to any particular shape, size, configuration, or the like.

The active material 14 preferably comprises a material that can be activated to provide expansion and/or detachment of the covering 13. In some embodiments, the active material 14 is chosen to provide contraction capabilities as well. In this manner, the active material based pad 12 is reversible and repeated use is available for example in situations where damage from impact is only very slight, or where impact is avoided altogether after actuation of the hood-lifting pad. As previously disclosed, preferred active materials 14 include shape memory alloys, electroactive polymers, shape memory polymers, piezoelectrics, and the like.

In some embodiments, the active materials comprise shape memory alloys in the form of fibers. The fibers may be configured as springs, loops, interconnecting networks, and the like. The fibers may be formed integrally with the support structure, or more preferably, may be attached directly to the lower plate support structure 16 and/or the covering 13. For example, the shape memory alloys can be mechanically clamped to the plate, an adhesive can be applied (e.g., silver-doped epoxy) to the lower plate support structure 16 and/or the covering 13 and the active material 14 can be mechanically pressed into the adhesive, and the like attachment means. Alternatively, vapor grown shape memory alloy fibers can be deposited directly from a gas phase onto a lower plate 16 and/or the covering 13. Preferably, the thickness, length, and overall geometry of the shape memory alloy fiber is suitable for providing an effective length dimension change at sufficient force levels to achieve actuation of hood lifting, i.e., to cause the covering 13 to expand and/or detach from the surrounding surface medium. The shape memory alloy fiber should also be of a thickness, length, and overall geometry effective to provide the desired shape memory effect. The fibers are not intended to be limited to any particular shape.

The lower plate supporting structure 16 may also comprise the activation device for providing the thermal activating signal to shape memory material depending on the particular design of the energy absorbing assembly. For example, the lower plate supporting structure 16 may incorporate a resistance type-heating block to provide a thermal energy signal sufficient to cause the shape change.

Employing the piezoelectric material will utilize an electrical signal for activation. Upon activation, the piezoelectric material will assume an arcuate shape, thereby causing displacement in the powered state. Upon discontinuation of the activation signal, the strips will assume its original shape, dimension, e.g., a straightened shape, dimension.

Similarly, activation of an EAP based pad preferably utilizes an electrical signal to provide change in shape, dimension, sufficient to provide displacement. Reversing the polarity of the applied voltage to the EAP can provide a reversible mechanism.

As previously discussed, the various shapes of the active material 14 employed in the energy absorbing active material based pads 12 are virtually limitless. Suitable geometrical arrangements may include cellular metal textiles, open cell foam structures, multiple layers of shape memory material similar to "bubble wrap", arrays of hooks and/or loops, and the like.

The activation times will generally vary depending on the intended application, the particular active material employed, the magnitude of the activation signal, and the like. For example, for hood and trunk lock downs, it is generally preferred to have an activation time of less than about 10 milliseconds, an activation time of less than 5 milliseconds more preferred for some applications, an activation time of less than 3 milliseconds even more preferred for other applications, and an activation time of less than 0.5 milliseconds for still other applications.

Advantageously, the hood assemblies utilizing the active materials to effect changes in energy absorption properties provides a relatively robust system compared to conventional systems utilizing stroking mechanisms based on hydraulics, and the like. Moreover, in addition to providing reversibility, the active material based actuators are relatively compact and of significantly lower weight. It should be recognized by those skilled in the art that the active materials as used herein allows the use of pre-crash sensors.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A vehicle, comprising:
a hood;
an underhood component;
an active material based pad including a lower plate in mechanical communication with the underhood component, an upper plate in mechanical communication with the hood, and an active material between the upper and lower plates, wherein the active material is configured to increase in length in response to an activation signal, thereby to urge the upper and lower plates apart; and
an activation device coupled to the active material.

2. A vehicle comprising: a hood;
an underhood component;
active material operative to increase in length thereby to increase the distance between the hood and the underhood component in response to an activation signal.

3. The vehicle of claim 2, wherein the active material comprises a shape memory alloy, a magnetic shape memory alloy, a shape memory polymer, an electroactive polymer, or a piezoelectric material.

4. The vehicle of claim 2, wherein the activation signal comprises a thermal activation signal, a magnetic activation signal, an electric activation signal, a chemical activation signal, or a mechanical load.

5. The vehicle of claim 2, wherein the active material undergoes a change in shape when subjected to the activation signal, and wherein the change in shape is reversible.

6. A system for mitigating damage to an object from impact with a vehicle hood, comprising:
a sensor that generates a signal based on pre-impact or impact information; and
a controller disposed to receive the sensor signal and deliver an activation signal to at least one device in operative communication with the hood and an underhood component; wherein the at least one device includes a lower plate, an upper plate, and an active material therebetween, wherein the active material is operative to increase from a first length to a second length in response to the activation signal.

7. The system according to claim 6, wherein the lower plate is in contact with the underhood component and the upper plate in contact with an underside of the hood, and wherein the change from the first length to the second length is effective to increase a space between the vehicle and the hood.

8. The system according to claim 6, wherein the active material comprises a shape memory alloy, a shape memory polymer, an electroactive polymer, or a piezoelectric material.

9. The system according to claim 6, wherein the increase from the first length to the second length in response to the activation signal changes an applied load to displace the hood and increases the energy absorbing properties of the hood.

10. The system according to claim 6, wherein the increase from the first length to the second length in response to the activation signal changes a force needed to locally deform the hood.

11. A method for reducing damage to an object from an impact with a hood, comprising:
sensing the impact;
generating an activation signal; and
activating a device in response to the activation signal, wherein the device is disposed between an underside of the hood and an underhood component and comprises an active material based pad having a lower plate, an upper plate, and an active material therebetween, wherein the active material changes a position of the hood relative to the underhood component from a first position to a second position by actively increasing a length dimension of the active material disposed in the device.

12. The method of claim 11, wherein changing the position of the hood from the first position to the second position is reversible.

13. The method of claim 11, wherein the active material comprises a shape memory alloy, a magnetic shape memory alloy, a shape memory polymer, an electroactive polymer, or a piezoelectric material.

14. A method according to claim 11, wherein sensing is accomplished with a pre-impact sensor.

15. A method according to claim 11, wherein sensing is accomplished with an impact sensor.

16. A method according to claim 11, wherein the generating the activation signal comprises manual activation.

17. A method according to claim 11, wherein the object is a pedestrian.

* * * * *